United States Patent
Cho

(10) Patent No.: US 8,904,104 B2
(45) Date of Patent: Dec. 2, 2014

(54) HYBRID STORAGE SYSTEM WITH MID-PLANE

(75) Inventor: Byungcheol Cho, Seochogu (KR)

(73) Assignee: Taejin Info Tech Co., Ltd., Seoul (KR)

( * ) Notice: Subject to any disclaimer, the term of this patent is extended or adjusted under 35 U.S.C. 154(b) by 133 days.

(21) Appl. No.: 12/796,709

(22) Filed: Jun. 9, 2010

(65) Prior Publication Data

US 2011/0307652 A1  Dec. 15, 2011

(51) Int. Cl.
| | | |
|---|---|---|
| G06F 12/00 | (2006.01) | |
| G06F 13/00 | (2006.01) | |
| G06F 13/28 | (2006.01) | |
| G06F 3/06 | (2006.01) | |
| G06F 11/10 | (2006.01) | |
| G06F 11/20 | (2006.01) | |

(52) U.S. Cl.
CPC ............ *G06F 3/061* (2013.01); *G06F 11/108* (2013.01); *G06F 11/2089* (2013.01); *G06F 2211/103* (2013.01); *G06F 3/0658* (2013.01); *G06F 3/0688* (2013.01)
USPC .......................................... 711/114; 711/105

(58) Field of Classification Search
CPC .............. G06F 11/108; G06F 11/2089; G06F 2211/103
USPC .................................................. 711/105, 114
See application file for complete search history.

(56) References Cited

U.S. PATENT DOCUMENTS

| | | | | |
|---|---|---|---|---|
| 7,162,654 | B1 * | 1/2007 | Price | 713/320 |
| 2004/0193791 | A1 * | 9/2004 | Felton et al. | 711/112 |
| 2008/0140932 | A1 * | 6/2008 | Flynn et al. | 711/114 |
| 2008/0313369 | A1 * | 12/2008 | Verdoorn et al. | 710/62 |
| 2009/0094620 | A1 * | 4/2009 | Kalwitz et al. | 719/325 |

OTHER PUBLICATIONS

Gruener, Wolfgang, DDR SSD Claims a massive 300,000 IOPS, May 4, 2009, Available at: http://www.tgdaily.com/hardware-features/42283-ddr-ssd-claims-a-massive-300000-iops.*

* cited by examiner

*Primary Examiner* — Ryan Bertram
(74) *Attorney, Agent, or Firm* — Saliwanchik, Lloyd & Eisenschenk

(57) ABSTRACT

The present invention relates to semiconductor storage systems (SSDs). Specifically, the present invention relates to a hybrid storage system with a mid-plane. In a typical embodiment, a mid-plane is provided. Coupled to one side of the mid-plane is a system control board and a communications module having a set (at least one) of ports. Coupled to a second side of the mid-plane is (among other components) a first RAID controller, which itself is coupled to a double data rate semiconductor storage device (DDR SSD) module having a set of DDR SSD units. Also coupled to the second side of the mid-plane is a second RAID controller, which itself is coupled to a hard disk drive (HDD) module having a set of HDD/Flash SDD units.

17 Claims, 5 Drawing Sheets

HYBRID STORAGE SYSTEM WITH MID-PLANE

CROSS-REFERENCE TO RELATED APPLICATIONS

This application is related in some aspects to commonly-owned, co-pending application Ser. No. 12/758,937, entitled SEMICONDUCTOR STORAGE DEVICE", filed on Apr. 13, 2010, the entire contents of which are herein incorporated by reference. This application is also related in some aspects to commonly-owned, co-pending application Ser. No. 12/796,735, entitled SWITCH-BASED HYBRID STORAGE SYSTEM, filed on Jun. 9, 2010, the entire contents of which are herein incorporated by reference.

FIELD OF THE INVENTION

The present invention generally relates to semiconductor storage devices (SSDs). Specifically, the present invention relates to a hybrid storage system with a mid-plane.

BACKGROUND OF THE INVENTION

As the need for more computer storage grows, more efficient solutions are being sought. As is known, there are various hard disk solutions that store/read data in a mechanical manner as a data storage medium. Unfortunately, data processing speed associated with hard disks is often slow. Moreover, existing solutions still use interfaces that cannot catch up with the data processing speed of memory disks having high-speed data input/output performance as an interface between the data storage medium and the host. Therefore, there is a problem in the existing area in that the performance of the memory disk cannot be property utilized.

SUMMARY OF THE INVENTION

In general, the present invention relates to semiconductor storage systems (SSDs). Specifically, the present invention relates to a hybrid storage system with a mid-plane. In a typical embodiment, a mid-plane is provided. Coupled to one side of the mid-plane is a system control board and a communications module having a set (at least one) of ports. Coupled to a second side of the mid-plane is (among other components) a first RAID controller, which itself is coupled to a double data rate semiconductor storage device (DDR SSD) module having a set of DDR SSD units. Also coupled to the second side of the mid-plane is a second RAID controller, which itself is coupled to a hard disk drive (HDD) module having a set of HDD/Flash SDD units.

A first aspect of the present invention provides a hybrid storage system, comprising: a mid-plane coupled to a system control board; a first RAID controller coupled to the mid-plane; a double data rate semiconductor storage device (DDR SSD) module coupled to the first RAID controller, the DDR SSD module comprising a set of DDR SSD units; a second RAID controller coupled to the mid-plane; and a hard disk drive (HDD) module coupled to the second RAID controller, the HDD module comprising a set of HDD/Flash SDD units.

A second aspect of the present invention provides a hybrid storage system, comprising: a mid-plane coupled to a system control board, the system control board comprising a set of processors coupled to a set of chips; a first RAID controller coupled to the mid-plane; a double data rate semiconductor storage device (DDR SSD) module coupled to the first RAID controller, the DDR SSD module comprising a set of DDR SSD units; a second RAID controller coupled to the mid-plane; and a hard disk drive (HDD) module coupled to the second RAID controller, the HDD module comprising a set of HDD/Flash SDD units.

A third aspect of the present invention provides a method for providing a hybrid storage system, comprising: coupling a mid-plane to a system control board, the system control board comprising a set of processors coupled to a set of chips; coupling a first RAID controller to the mid-plane; coupling a double data rate semiconductor storage device (DDR SSD) module to the first RAID controller, the DDR SSD module comprising a set of DDR SSD units; coupling a second RAID controller to the mid-plane; and coupling a hard disk drive (HDD) module to the second RAID controller, the HDD module comprising a set of HDD/Flash SDD units.

BRIEF DESCRIPTION OF THE DRAWINGS

These and other features of this invention will be more readily understood from the following detailed description of the various aspects of the invention taken in conjunction with the accompanying drawings in which.

Figure 1:
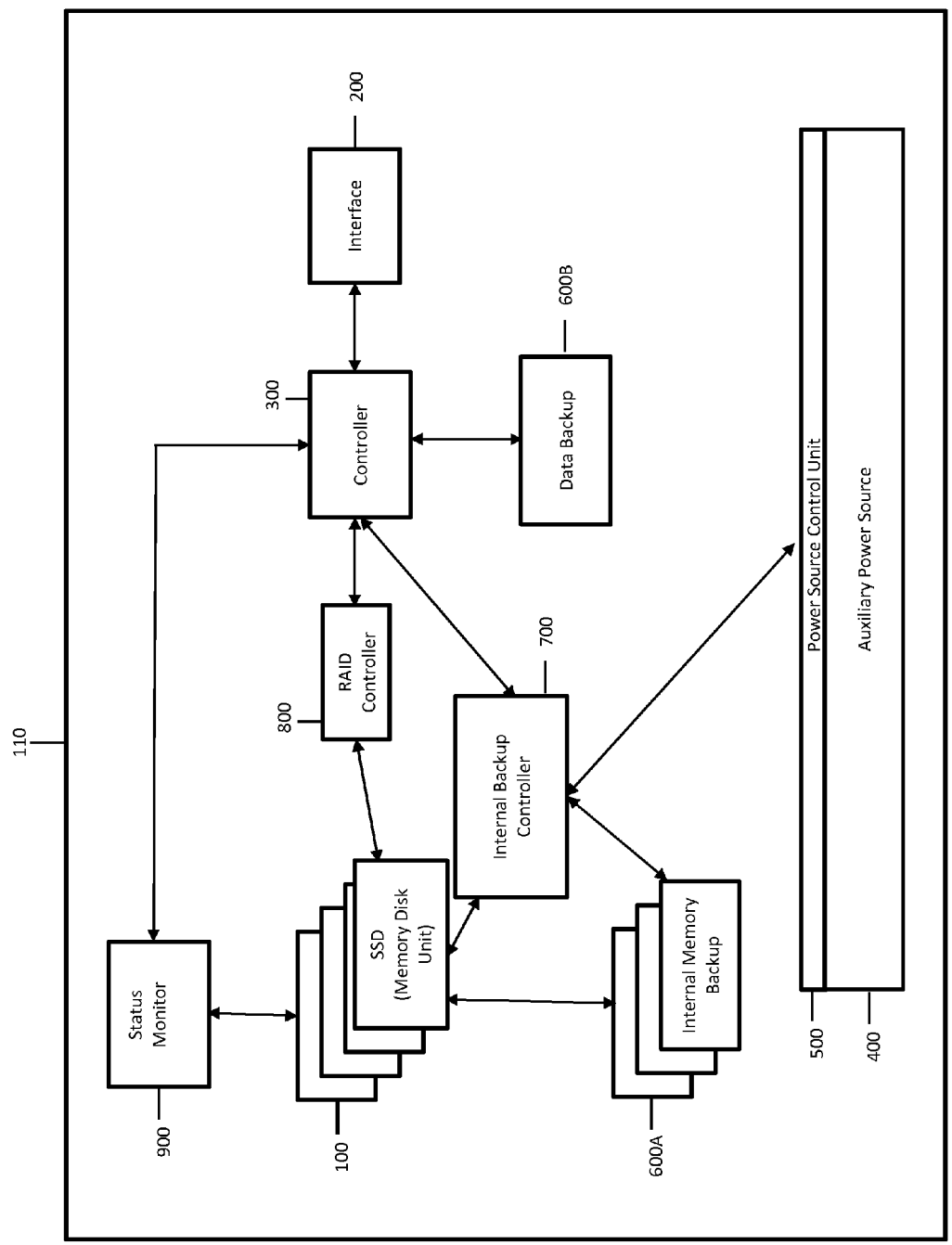
FIG. 1 is a diagram schematically illustrating a configuration of a RAID controlled storage device of a PCI-Express (PCI-e) type according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments now will be described more fully herein with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc. do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Moreover, as used herein, the term RAID means redundant array of independent disks (originally redundant array of inexpensive disks). In general, RAID technology is a way of storing the same data in different places (thus, redundantly) on multiple hard disks. By placing data on multiple disks, I/O (input/output) operations can overlap in a balanced way, improving performance. Since multiple disks increase the mean time between failures (MTBF), storing data redundantly also increases fault tolerance. The term SSD means semiconductor storage device. The term DDR means double data rate. Still yet, the term HDD means hard disk drive.

Unless otherwise defined, all terms (including technical and scientific terms) used herein have the same meaning as commonly understood by one of ordinary skill in the art. It will be further understood that terms such as those defined in commonly used dictionaries should be interpreted as having a meaning that is consistent with their meaning in the context of the relevant art and the present disclosure, and will not be interpreted in an idealized or overly formal sense unless expressly so defined herein.

Hereinafter, a RAID storage device of a serial attached small computer system interface/serial advanced technology attachment (PCI-Express) type according to an embodiment will be described in detail with reference to the accompanying drawings.

As indicated above, the present invention relates to semiconductor storage systems (SSDs). Specifically, the present invention relates to a hybrid storage system with a mid-plane. In a typical embodiment, a mid-plane is provided. Coupled to one side of the mid-plane is a system control board and a communications module having a set (at least one) of ports. Coupled to a second side of the mid-plane is (among other components) a first RAID controller, which itself is coupled to a double data rate semiconductor storage device (DDR SSD) module having a set of DDR SSD units. Also coupled to the second side of the mid-plane is a second RAID controller, which itself is coupled to a hard disk drive (HDD) module having a set of HDD/Flash SDD units.

The storage device of a serial attached small computer system interface/serial advanced technology attachment (PCI-Express) type supports a low-speed data processing speed for a host by adjusting synchronization of a data signal transmitted/received between the host and a memory disk during data communications between the host and the memory disk through a PCI-Express interface, and simultaneously supports a high-speed data processing speed for the memory disk, thereby supporting the performance of the memory to enable high-speed data processing in an existing interface environment at the maximum. It is understood in advance that although PCI-Express technology will be utilized in a typical embodiment, other alternatives are possible. For example, the present invention could utilize SAS/SATA technology in which a SAS/SATA type storage device is provided that utilizes a SAS/SATA interface.

Referring now to FIG. 1, a diagram schematically illustrating a configuration of a PCI-Express type, RAID controlled storage device (e.g., for providing storage for a serially attached computer device) according to an embodiment of the invention is shown. As depicted, FIG. 1 shows a RAID controlled PCI-Express type storage device according to an embodiment of the invention which includes a memory disk unit 100 comprising: a plurality of memory disks having a plurality of volatile semiconductor memories (also referred to herein as high-speed SSDs 100); a RAID controller 800 coupled to SSDs 100; an interface unit 200 (e.g., PCI-Express host) which interfaces between the memory disk unit and a host; a controller unit 300; an auxiliary power source unit 400 that is charged to maintain a predetermined power using the power transferred from the host through the PCI-Express host interface unit; a power source control unit 500 that supplies the power transferred from the host through the PCI-Express host interface unit to the controller unit, the memory disk unit, the backup storage unit, and the backup control unit which, when the power transferred from the host through the PCI-Express host interface unit is blocked or an error occurs in the power transferred from the host, receives power from the auxiliary power source unit and supplies the power to the memory disk unit through the controller unit; a backup storage unit 600 that stores data of the memory disk unit; and a backup control unit 700 that backs up data stored in the memory disk unit in the backup storage unit, according to an instruction from the host or when an error occurs in the power transmitted from the host.

The memory disk unit 100 includes a plurality of memory disks provided with a plurality of volatile semiconductor memories for high-speed data input/output (for example, DDR, DDR2, DDR3, SDRAM, and the like), and inputs and outputs data according to the control of the controller 300. The memory disk unit 100 may have a configuration in which the memory disks are arrayed in parallel.

The PCI-Express host interface unit 200 interfaces between a host and the memory disk unit 100. The host may be a computer system or the like, which is provided with a PCI-Express interface and a power source supply device.

The controller unit 300 adjusts synchronization of data signals transmitted/received between the PCI-Express host interface unit 200 and the memory disk unit 100 to control a data transmission/reception speed between the PCI-Express host interface unit 200 and the memory disk unit 100.

Figure 2:
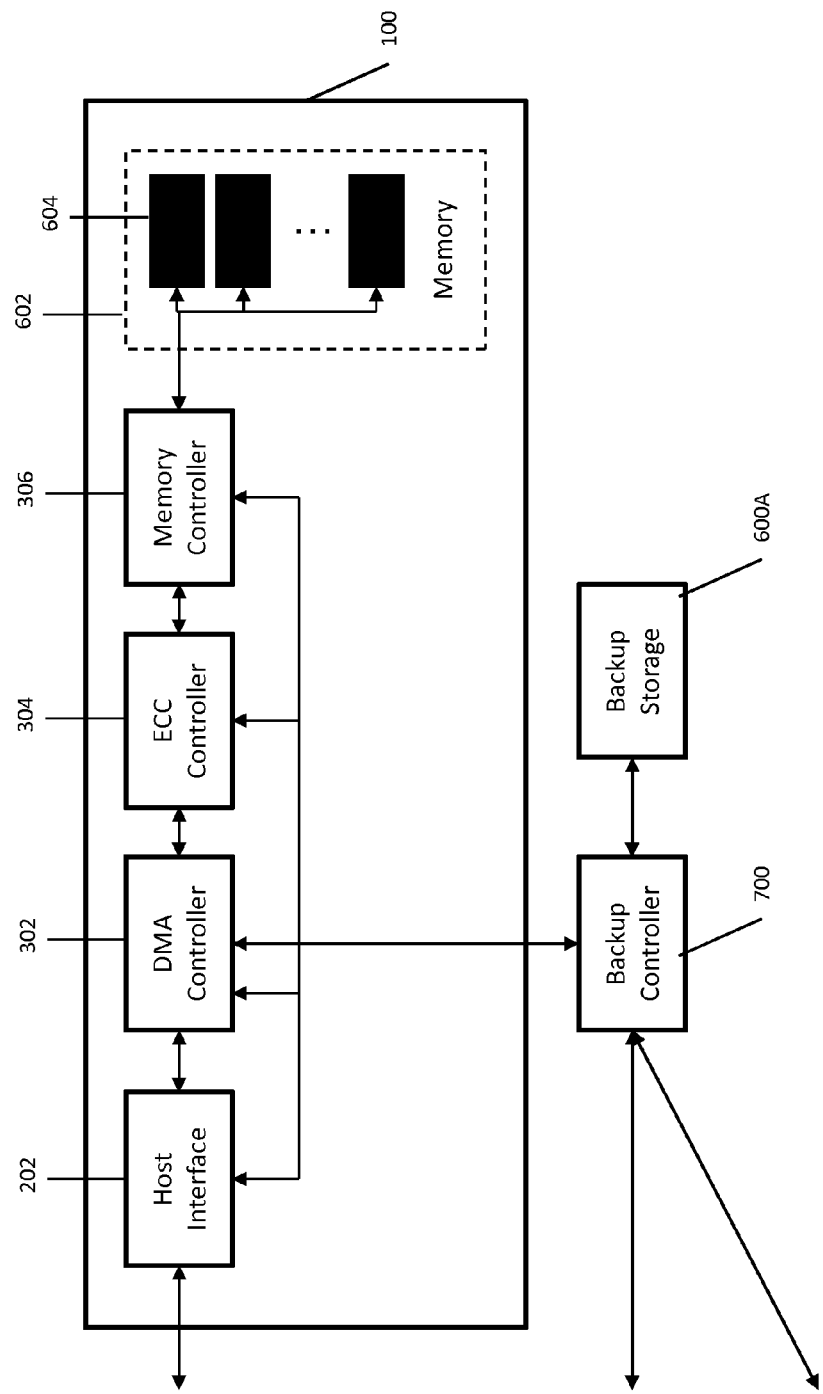
FIG. 2 is a more specific diagram of a RAID controller coupled to a set of SSDs.

Referring now to FIG. 2, a more detailed diagram of a RAID controlled SSD 810 is shown. As depicted, a PCI-e type RAID controller 800 can be directly coupled to any quantity of SSDs 100. Among other things, this allows for optimum control of SSDs 100. Among other things, the use of a RAID controller 800:
1. Supports the current backup/restore operations.
2. Provides additional and improved backup function by performing the following:
    a) the internal backup controller determines the backup (user's request order or the status monitor detects power supply problems);
    b) the internal backup controller requests a data backup to SSDs;
    c) the internal backup controller requests internal backup device to backup data immediately;
    d) monitors the status of the backup for the SSDs and internal backup controller; and
    e) reports the internal backup controller's status and end-op.
3. Provides additional and improved restore function by performing the following:
    a) the internal backup controller determines the restore (user's request order or the status monitor detects power supply problems);
    b) the internal backup controller requests a data restore to the SSDs;
    c) the internal backup controller requests an internal backup device to restore data immediately;

d) monitors the status of the restore for the SSDs and internal backup controller; and e) reports the internal backup controller status and end-op.

Figure 3:
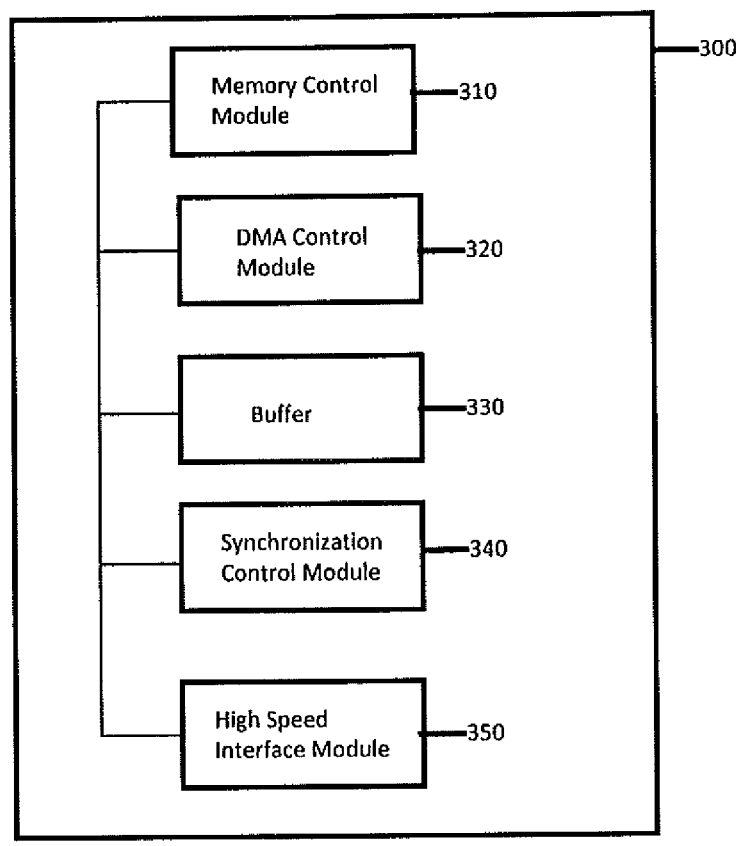
FIG. 3 is a diagram schematically illustrating a configuration of the high-speed SSD of FIG. 1.

Referring now to FIG. 2, a diagram schematically illustrating a configuration of the high-speed SSD 100 is shown. As depicted, SSD/memory disk unit 100 comprises: a host interface 202 (e.g., PCI-Express host) (which can be interface 200 of FIG. 1, or a separate interface as shown); a DMA controller 302 interfacing with a backup control module 700; an ECC controller; and a memory controller 306 for controlling one or more blocks 604 of memory 602 that are used as high-speed storage. FIG. 3 is a diagram schematically illustrating a configuration of the controller unit provided in the PCI-Express type storage device according to the embodiment. Referring to FIG. 3, the controller unit 300 according to the embodiment includes: a memory control module 310 which controls data input/output of the memory disk unit 100; a DMA (Direct Memory Access) control module 320 which controls the memory control module 310 to store the data in the memory disk unit 100, or reads data from the memory disk unit 100 to provide the data to the host, according to an instruction from the host received through the PCI-Express host interface unit 200; a buffer 330 which buffers data according to the control of the DMA control module 320; a synchronization control module 340 which, when receiving a data signal corresponding to the data read from the memory disk unit 100 by the control of the DMA control module 320 through the DMA control module 320 and the memory control module 310, adjusts synchronization of a data signal so as to have a communication speed corresponding to a PCI-Express communications protocol to transmit the synchronized data signal to the PCI-Express host interface unit 200, and when receiving a data signal from the host through the PCI-Express host interface unit 200, adjusts synchronization of the data signal so as to have a transmission speed corresponding to a communications protocol (for example, PCI, PCI-x, or PCI-e, and the like) used by the memory disk unit 100 to transmit the synchronized data signal to the memory disk unit 100 through the DMA control module 320 and the memory control module 310; and a high-speed interface module 350 which processes the data transmitted/received between the synchronization control module 340 and the DMA control module 320 at high speed. Here, the high-speed interface module 350 includes a buffer having a double buffer structure and a buffer having a circular queue structure, and processes the data transmitted/received between the synchronization control module 340 and the DMA control module 320 without loss at high speed by buffering the data transmitted/received between the synchronization control module 340 and the DMA control module 320 using the buffers and adjusting data clocks.

Figure 4:
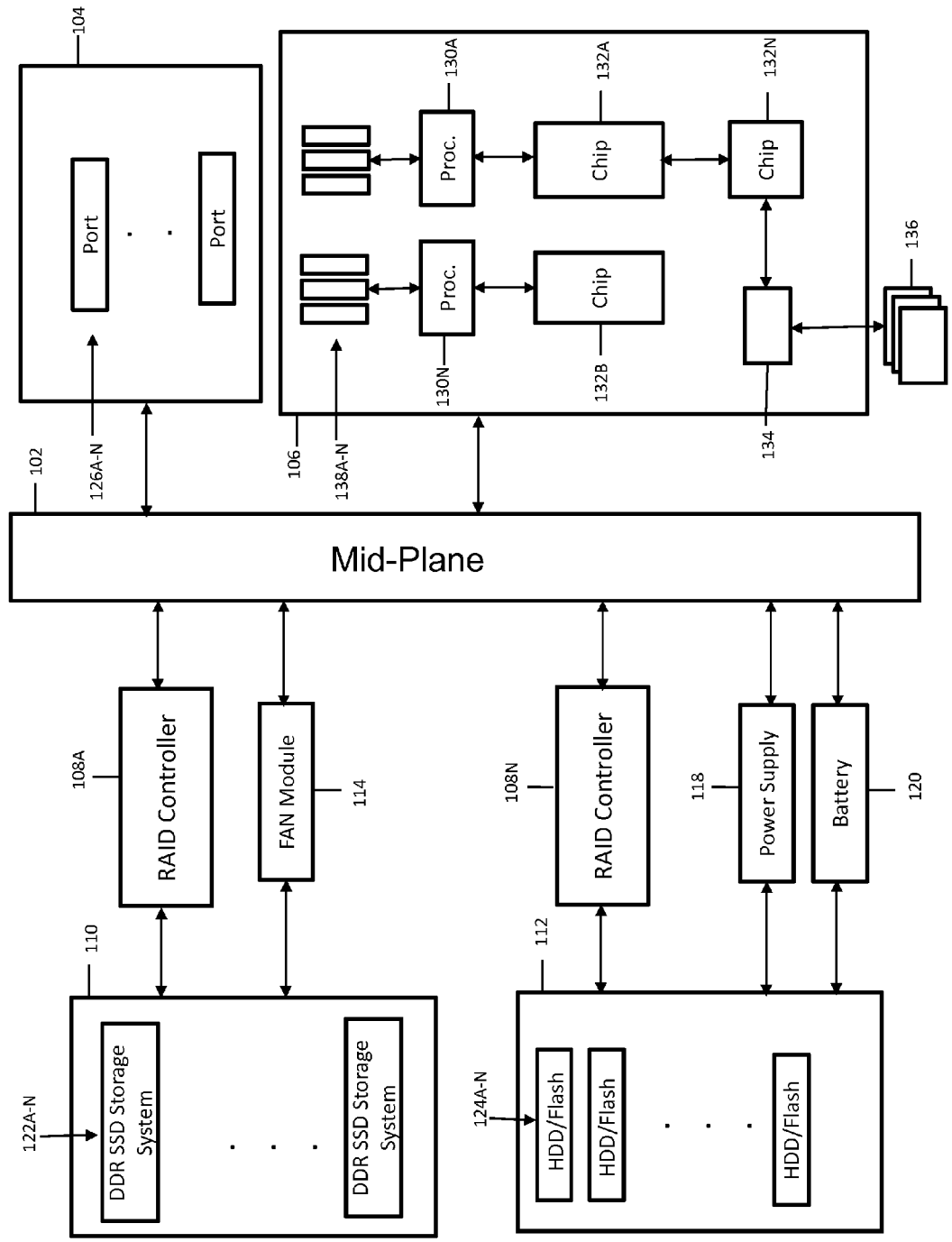
FIG. 4 is a diagram schematically illustrating the hybrid storage system with mid-plane according to an embodiment of the present invention.
Figure 5:
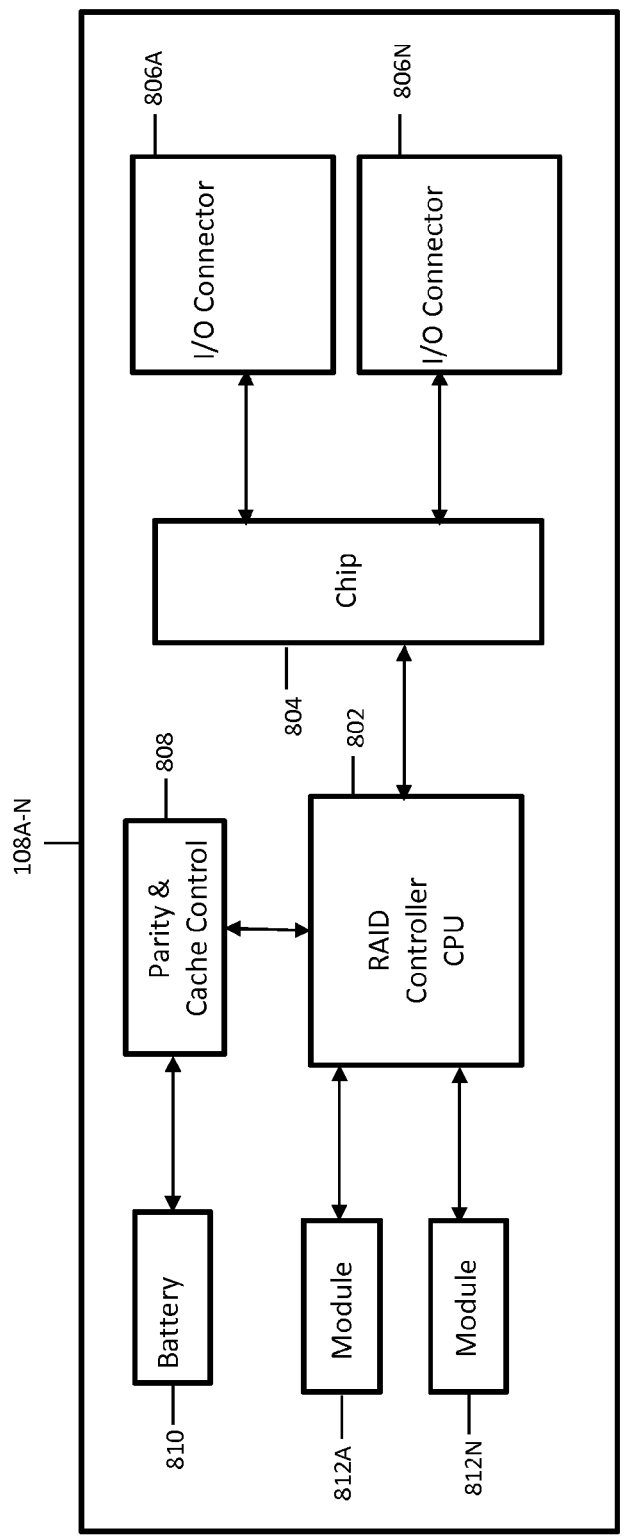
FIG. 5 is a diagram schematically illustrating the RAID controllers shown in FIG. 4 according to an embodiment of the present invention.

Referring now to FIG. 4, a hybrid storage system according to the present invention is shown. It is understood in advance that any connections/components shown in FIGS. 4-5 are preferable of the PCI-Express type. As depicted, the system of the present invention includes a mid-plane 102 coupled to a communications module 104 and a system control board 106. The communications module typically comprises a set (at least one) of ports 126A-N. Moreover, system control board 106 comprises a first chip coupled 132A (e.g., IOH) to a first processor 130A (e.g., Intel Xenon Quad-Core 5520 series); a second chip 132B (e.g., IOH) coupled to a second processor 130N (e.g., Intel Xenon Quad-Core 5520 series); and a third chip 132N (e.g., ICH 10R) coupled to the first chip 132A. In addition, DDR34 memory units 138A-N can be coupled to one or both processors 130A-N. Also shown in system control board 106 are I/O adapter/interfaces 134 coupled to third chip 132N and to external devices 136 (e.g., cards, etc.). Coupled to a second side of mid-plane 102 are RAID controllers 108A-N, fan module 114, power supply 118, and battery module 120. Although not shown, chips 132A-B can have multiple PCI-E Gen.2×16 interconnects.

As further depicted, a double data rate semiconductor storage device (DDR SSD) module 110 (shown in greater detail in FIG. 1) is coupled to the RAID controller 108A. DDR SSD module 110 typically comprises a set of DDR SSD (memory) units 122A-N. A hard disk drive (HDD) module 112 is coupled to RAID controller 108N. HDD module 112 typically comprises a set of HDD/Flash SDD (memory) units 124A-N.

Referring now to FIG. 5, RAID controllers 108A-N will be depicted in greater detail. As shown, RAID controllers 108A-N typically comprise: a RAID controller CPU 802; a chip 804 coupled to the RAID controller CPU 802; and a set of input/output (I/O) connectors (e.g., MOLEX) 806A-N coupled to the chip 804. Further, a parity and cache control module 808 can be coupled to CPU 802, and a battery module 810 can be coupled to parity and cache control module 808. Still yet, memory modules 812A-N can be coupled to CPU 802 as depicted.

Referring back to FIG. 1, auxiliary power source unit 400 may be configured as a rechargeable battery or the like, so that it is normally charged to maintain a predetermined power using power transferred from the host through the PCI-Express host interface unit 200 and supplies the charged power to the power source control unit 500 according to the control of the power source control unit 500.

The power source control unit 500 supplies the power transferred from the host through the PCI-Express host interface unit 200 to the controller unit 300, the memory disk unit 100, the backup storage unit 600, and the backup control unit 700.

In addition, when an error occurs in a power source of the host because the power transmitted from the host through the PCI-Express host interface unit 200 is blocked, or the power transmitted from the host deviates from a threshold value, the power source control unit 500 receives power from the auxiliary power source unit 400 and supplies the power to the memory disk unit 100 through the controller unit 300.

The backup storage unit 600 is configured as a low-speed non-volatile storage device such as a hard disk and stores data of the memory disk unit 100.

The backup control unit 700 backs up data stored in the memory disk unit 100 in the backup storage unit 600 by controlling the data input/output of the backup storage unit 600 and backs up the data stored in the memory disk unit 100 in the backup storage unit 600 according to an instruction from the host, or when an error occurs in the power source of the host due to a deviation of the power transmitted from the host deviates from the threshold value.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

The present invention supports a low-speed data processing speed for a host by adjusting synchronization of a data signal transmitted/received between the host and a memory disk during data communications between the host and the memory disk through a PCI-Express interface and simultaneously supports a high-speed data processing speed for the memory disk, thereby supporting the performance of the memory to enable high-speed data processing in an existing interface environment at the maximum.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A hybrid storage system, comprising:
   a storage unit comprising:
      a mid-plane external to a system control board and directly coupled to the system control board,
      a first RAID controller external to the mid-plane and directly coupled to the mid-plane,
      a double data rate semiconductor storage device (DDR SSD) module coupled to the first RAID controller, the DDR SSD module comprising a set of DDR SSD units,
      a second RAID controller external to the mid-plane and directly coupled to the mid-plane, and
      a hard disk drive (HDD) module coupled to the second RAID controller, the HDD module comprising a set of HDD/Flash SDD units;
   a controller comprising a synchronization control module adjusting synchronization of a data signal from or to the storage unit;
   a fan module directly coupled to the mid-plane and the DDR SSD module;
   a power supply module directly coupled to the mid-plane and the HDD module; and
   a battery module directly coupled to the mid-plane and the HDD module.

2. The hybrid storage system of claim 1, the system control board comprising:
   a first chip coupled to a first processor;
   a second chip coupled to a second processor; and
   a third chip coupled to the first chip.

3. The hybrid storage system of claim 1, further comprising a communications module coupled to the mid-plane.

4. The hybrid storage system of claim 3, the communications module having a plurality of ports.

5. The hybrid storage system of claim 1, the first RAID controller and the second RAID controller each comprising:
   a RAID controller CPU;
   a chip coupled to the RAID controller CPU; and
   a set of input/output (I/O) connectors coupled to the chip.

6. The hybrid storage system of claim 5, the first RAID controller and the second RAID controller each further comprising a parity and cache control component.

7. A hybrid storage system, comprising:
   a storage unit comprising:
      a mid-plane external to a system control board and directly coupled to the system control board, the system control board comprising a set of processors coupled to a set of chips,
      a first RAID controller external to the mid-plane and directly coupled to the mid-plane,
      a double data rate semiconductor storage device (DDR SSD) module coupled to the first RAID controller, the DDR SSD module comprising a set of DDR SSD units,
      a second RAID controller external to the mid-plane and directly coupled to the mid-plane, and
      a hard disk drive (HDD) module coupled to the second RAID controller, the HDD module comprising a set of HDD/Flash SDD units;
   a controller comprising a synchronization control module adjusting synchronization of a data signal from or to the storage unit;
   a fan module directly coupled to the mid-plane and the DDR SSD module;
   a power supply module directly coupled to the mid-plane and the HDD module; and
   a battery module directly coupled to the mid-plane and the HDD module.

8. The hybrid storage system of claim 7, the system control board comprising:
   a first chip coupled to a first processor;
   a second chip coupled to a second processor; and
   a third chip coupled to the first chip.

9. The hybrid storage system of claim 7, further comprising a communications module coupled to the mid-plane.

10. The hybrid storage system of claim 9, the communications module having a plurality of ports.

11. The hybrid storage system of claim 7, the first RAID controller and the second RAID controller each comprising:
    a RAID controller CPU;
    a chip coupled to the RAID controller CPU; and
    a set of input/output (I/O) connectors coupled to the chip.

12. The hybrid storage system of claim 11, the first RAID controller and the second RAID controller each further comprising a parity and cache control component.

13. A method for providing a hybrid storage system, comprising:
    coupling a storage unit to a system control board comprising a set of processors coupled to a set of chips by:
       directly coupling a mid-plane to the system control board wherein the mid-plane is external to the system control board,
       directly coupling a first RAID controller to the mid-plane wherein the first RAID controller is external to the mid-plane,
       coupling a double data rate semiconductor storage device (DDR SSD) module to the first RAID controller, the DDR SSD module comprising a set of DDR SSD units,
       directly coupling a second RAID controller to the mid-plane wherein the second RAID controller is external to the mid-plane, and
       coupling a hard disk drive (HDD) module to the second RAID controller, the HDD module comprising a set of HDD/Flash SDI) units;
    coupling a controller to the memory disk unit, the controller comprising a synchronization control module adjusting synchronization of a data signal from or to the storage unit;
    directly coupling a fan module to the mid-plane and the DDR SSD module;
    directly coupling a power supply module to the mid-plane and the HDD module; and
    directly coupling a battery module to the mid-plane and the HDD module.

14. The method of claim 13, the system control board comprising:

coupling a first chip to a first processor;
coupling a second chip to a second processor; and
coupling a third chip to the first chip.

15. The method of claim 13, further comprising coupling a communications module to the mid-plane.

16. The method of claim 15, the communications module having a plurality of ports.

17. The method of claim 13, the first RAID controller and the second RAID controller each comprising:
a RAID controller CPU;
a chip coupled to the RAID controller CPU; and
a set of input/output (I/O) connectors coupled to the chip.

* * * * *